US012696097B2

(12) United States Patent
Zhang et al.

(10) Patent No.: US 12,696,097 B2
(45) Date of Patent: Jul. 28, 2026

(54) WIRELESS COMMUNICATION METHOD, NETWORK ENTITY, USER EQUIPMENT AND STORAGE MEDIUM

(71) Applicant: Samsung Electronics Co., Ltd., Suwon-si (KR)

(72) Inventors: Yuanyuan Zhang, Beijing (CN); He Wang, Beijing (CN); Yankun Li, Beijing (CN); Bozhi Li, Beijing (CN); Chanho An, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 554 days.

(21) Appl. No.: 18/166,110

(22) Filed: Feb. 8, 2023

(65) Prior Publication Data

US 2023/0254703 A1 Aug. 10, 2023

(30) Foreign Application Priority Data

Feb. 10, 2022 (CN) .......................... 202210125321.9

(51) Int. Cl.
*H04W 16/14* (2009.01)
*H04B 17/336* (2015.01)
*H04W 72/542* (2023.01)

(52) U.S. Cl.
CPC .......... *H04W 16/14* (2013.01); *H04B 17/336* (2015.01); *H04W 72/542* (2023.01)

(58) Field of Classification Search
CPC .......... H04B 1/10; H04B 1/525; H04B 17/10; H04B 17/21; H04B 17/336; H04B 17/345; H04W 8/24; H04W 88/06; H04W 16/14; H04W 72/51; H04W 72/04; H04W 72/0453; H04W 72/542; H04W 76/11
See application file for complete search history.

(56) References Cited

U.S. PATENT DOCUMENTS

| | | | |
|---|---|---|---|
| 2013/0303168 A1 | 11/2013 | Aminzadeh Gohari et al. | |
| 2017/0054535 A1 | 2/2017 | Im et al. | |
| 2019/0158137 A1 | 5/2019 | Brunel et al. | |
| 2020/0045720 A1 * | 2/2020 | Abdel Shahid ... | H04W 72/1268 |
| 2020/0359398 A1 * | 11/2020 | Takahashi ............. | H04W 16/32 |
| 2021/0126753 A1 * | 4/2021 | Mochizuki ........... | H04L 5/0037 |

(Continued)

FOREIGN PATENT DOCUMENTS

| | | |
|---|---|---|
| WO | 2020/197129 A1 | 10/2020 |
| WO | 2020/201617 A1 | 10/2020 |

OTHER PUBLICATIONS

International Search Report dated Apr. 26, 2023, issued in International Patent Application No. PCT/KR2023/001191.

*Primary Examiner* — Benjamin H Elliott, IV
*Assistant Examiner* — Prince A Mensah
(74) *Attorney, Agent, or Firm* — Jefferson IP Law, LLP

(57) ABSTRACT

A wireless communication method, a network entity, a UE, and a non-transitory storage medium are provided. The wireless communication method performed by a network entity includes receiving first information from a user equipment (UE), wherein the first information is information related to whether the UE supports a second maximum sensitivity degradation (MSD) lower than a first MSD for a band combination or a band in the band combination, and configuring the band combination for the UE or not configuring the band combination for the UE based on the first information.

12 Claims, 11 Drawing Sheets

(56)         References Cited

U.S. PATENT DOCUMENTS

| | | | |
|---|---|---|---|
| 2022/0225080 A1* | 7/2022 | Ng | H04W 24/10 |
| 2023/0100287 A1* | 3/2023 | Wang | H04B 17/336 |
| | | | 370/329 |
| 2023/0371056 A1* | 11/2023 | Xing | H04W 72/0453 |
| 2024/0365250 A1* | 10/2024 | Liu | H04W 52/367 |
| 2025/0081173 A1* | 3/2025 | Umeda | H04W 8/24 |

* cited by examiner

FIG. 6

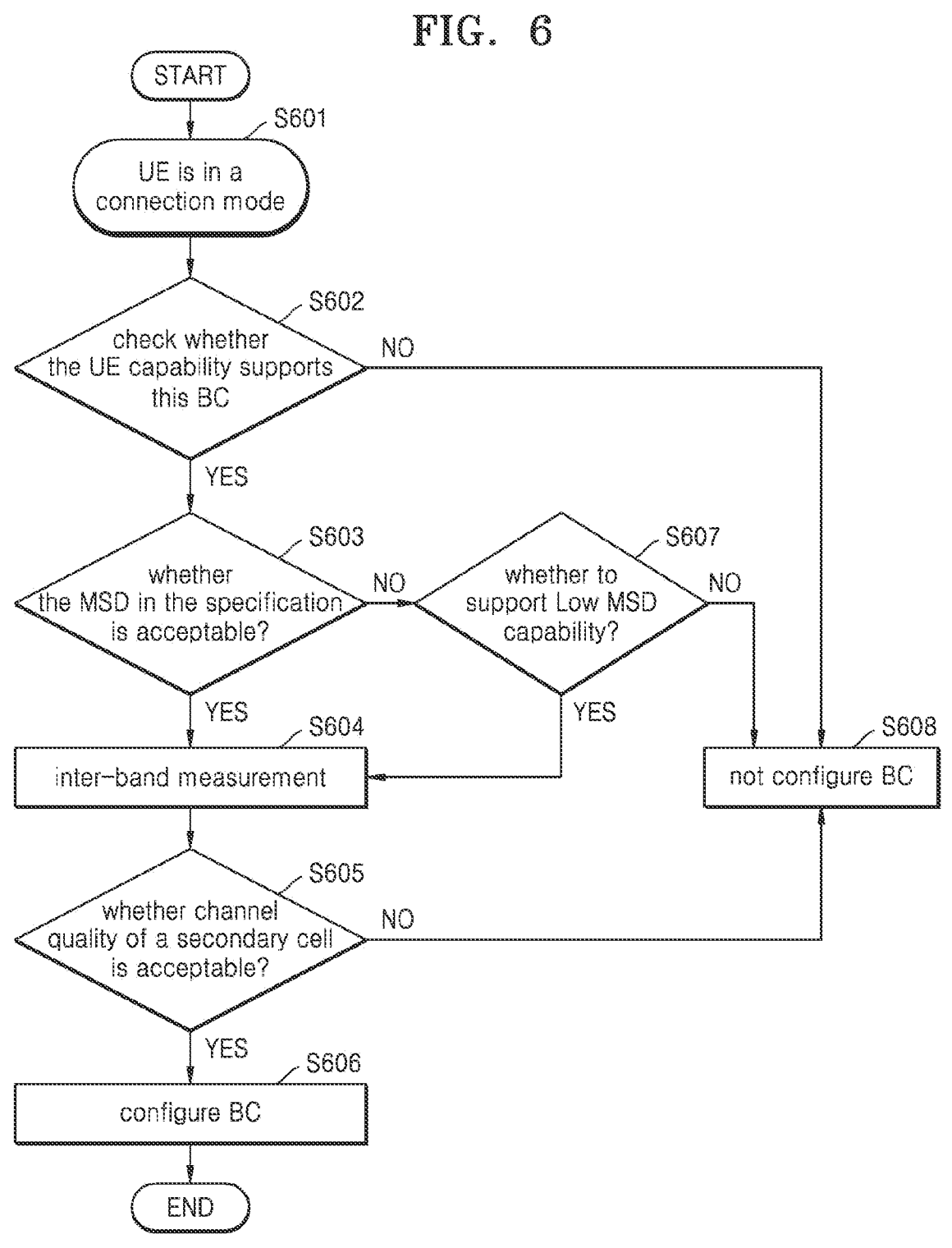

START

S601
UE is in a connection mode

S602
check whether the UE capability supports this BC — NO

YES

S603
whether the MSD in the specification is acceptable? — NO →

S607
whether to support Low MSD capability? — NO

YES

S604
inter-band measurement

S608
not configure BC

S605
whether channel quality of a secondary cell is acceptable? — NO

YES

S606
configure BC

END

WIRELESS COMMUNICATION METHOD, NETWORK ENTITY, USER EQUIPMENT AND STORAGE MEDIUM

CROSS-REFERENCE TO RELATED APPLICATION(S)

This application is based on and claims priority under 35 U.S.C. § 119(a) of a Chinese patent application number 202210125321.9, filed on Feb. 10, 2022, in the Chinese Intellectual Property Office, the disclosure of which is incorporated by reference herein in its entirety.

BACKGROUND

1. Field

The disclosure relates to a communication field. More particularly, the disclosure relates to a wireless communication method, a network entity, a User Equipment (UE), and a storage medium.

2. Description of Related Art

Fifth generation (5G) mobile communication technologies define broad frequency bands such that high transmission rates and new services are possible, and can be implemented not only in "Sub 6 gigahertz (GHz)" bands such as 3.5 GHz, but also in "Above 6 GHz" bands referred to as millimeter wave (mmWave) including 28 GHz and 39 GHz. In addition, it has been considered to implement sixth generation (6G) mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive multi input multi output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of Band-Width Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, new radio (NR) UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step random access channel (RACH) for NR). There also has been ongoing standardization in system architecture/service regarding a 5G baseline architecture (for example, service-based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a wireless communication method, a Network entity, UE, an electronic apparatus, and a storage medium to at least solve the above problems in related technologies.

Additional aspects will be set forth in part in the description which follows and, in part, will be apparent from the description, or may be learned by practice of the presented embodiments.

In accordance with an aspect of the disclosure, a wireless communication method performed by a network entity is provided. The wireless communication method includes receiving first information from a UE, wherein the first information is information related to whether the UE supports a second maximum sensitivity degradation (MSD) which is lower than a first MSD for a band combination or a band within the band combination for the UE, and configuring the band combination for the UE or not configuring the band combination for the UE based on the first information.

In accordance with another aspect of the disclosure, a wireless communication method performed by a user equipment (UE) is provided. The wireless communication method includes sending first information to a network entity, wherein the first information is information related to whether the UE supports second maximum sensitivity degradation (MSD) which is lower than first MSD for a band combination or a band within the band combination for the UE.

In accordance with another aspect of the disclosure, a network entity is provided. The network entity includes a transceiver, and at least one processor, coupled to the transceiver and configured to receive first information from a user equipment (UE), wherein the first information is information related to whether the UE supports a second maximum sensitivity degradation (MSD) lower than a first MSD for a band combination or a band in the band combination, and configure the band combination for the UE or not configuring the band combination for the UE based on the first information.

In accordance with another aspect of the disclosure, a user equipment is provided. The user equipment includes a transceiver, and at least one processor, coupled to the transceiver and configured to send first information to a network entity, wherein the first information is information related to whether the UE supports second maximum sensitivity degradation (MSD) lower than first MSD for a band combination or a band in the band combination.

In accordance with another aspect of the disclosure, a non-transitory computer-readable storage medium having instructions stored thereon, wherein the instructions, when executed by at least one processor, cause the at least one processor to perform the following operations: receiving first information from a user equipment (UE), wherein the first information is information related to whether the UE supports a second maximum sensitivity degradation (MSD) lower than a first MSD for a band combination or a band in the band combination, and configuring the band combination for the UE or not configuring the band combination for the UE based on the first information.

The technical solutions provided by the embodiments of the disclosure bring at least the following beneficial effects according to the above wireless communication method, the network entity receives the first information (the first information is information related to whether the UE supports second maximum sensitivity degradation (MSD) which is lower than first MSD for a band combination or a band in the band combination) from the UE, configuring the band combination for the UE or not configuring the band combination for the UE according to the first information, the band combination can be configured more flexibly and accurately.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6 is a flow chart of the wireless communication method configuring a BC for a UE according to an embodiment of the disclosure;

Throughout the drawings, it should be noted that like reference numbers are used to depict the same or similar elements, features, and structures.

DETAILED DESCRIPTION

Figure 1:
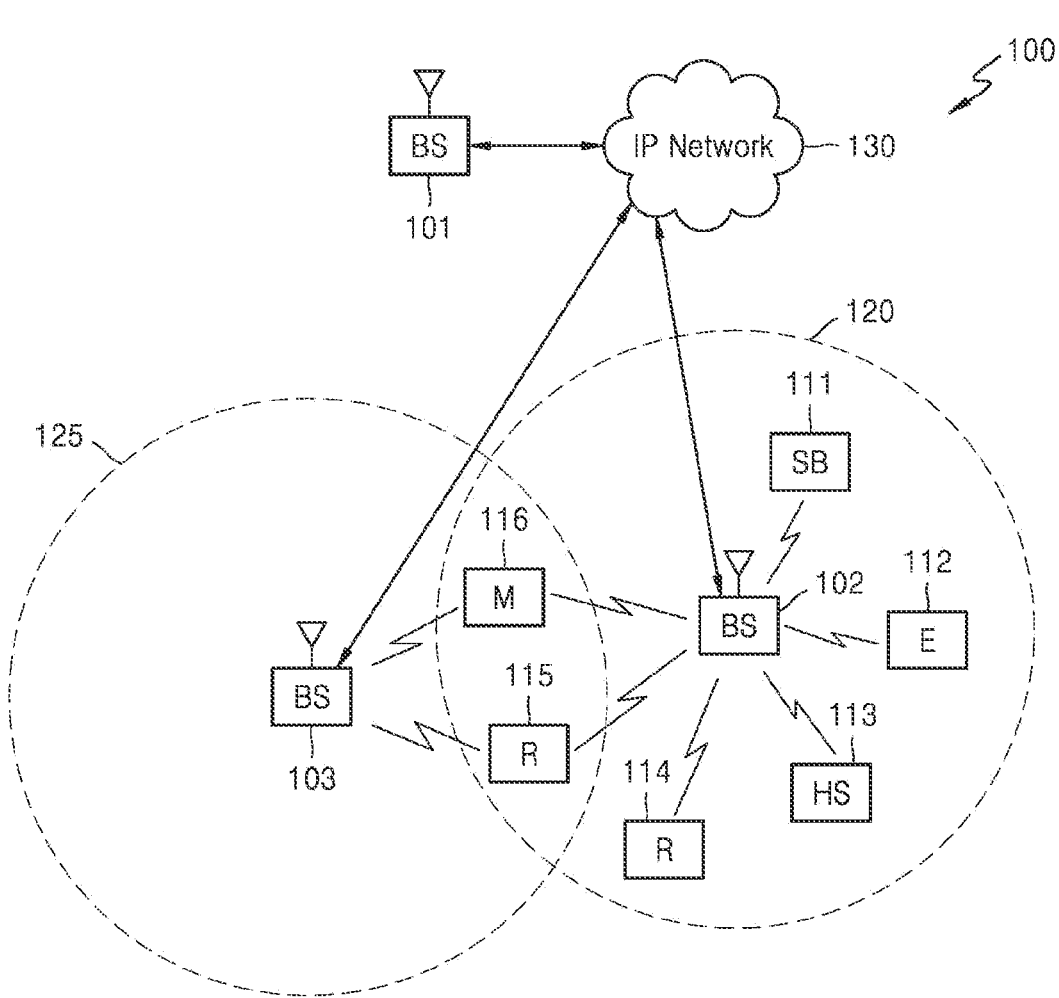
FIG. 1 is a wireless network according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include" or "may include" refers to the existence of a corresponding disclosed function, operation or component which can be used in various embodiments of the disclosure and does not limit one or more additional functions, operations, or components. The terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

The term "or" used in various embodiments of the disclosure includes any or all of combinations of listed words. For example, the expression "A or B" may include A, may include B, or may include both A and B.

Unless defined differently, all terms used herein, which include technical terminologies or scientific terminologies, have the same meaning as that understood by a person skilled in the art to which the disclosure belongs. Such terms as those defined in a generally used dictionary are to be interpreted to have the meanings equal to the contextual meanings in the relevant field of art, and are not to be interpreted to have ideal or excessively formal meanings unless clearly defined in the disclosure.

Various embodiments of the disclosure are further described below in conjunction with the accompanying drawings. The text and figures are provided by way of example only to assist the reader in understanding the disclosure. They are not intended and should not be construed to limit the scope of the disclosure in any way. While certain embodiments and examples have been provided, based on the contents disclosed herein, it will be apparent to those skilled in the art that the illustrated embodiments and examples can be modified without departing from the scope of the disclosure.

FIG. 1 illustrates a wireless network 100 according to an embodiment of the disclosure. The embodiment of the wireless network 100 shown in FIG. 1 is for illustration only. Other embodiments of the wireless network 100 can be used without departing from the scope of the disclosure.

The wireless network 100 includes a gNodeB (gNB) 101, a gNB 102, and a gNB 103. The gNB 101 communicates with gNB 102 and gNB 103. The gNB 101 also communicates with at least one Internet Protocol (IP) network 130, such as the Internet, a private IP network, or other data networks.

Depending on a type of the network, other well-known terms such as "base station" or "access point" can be used instead of "gNodeB" or "gNB". For convenience, the terms "gNodeB" and "gNB" are used in this patent document to refer to network infrastructure components that provide wireless access for remote terminals. And, depending on the type of the network, other well-known terms such as "mobile station", "user station", "remote terminal", "wireless terminal" or "user apparatus" can be used instead of "user equipment" or "UE". For convenience, the terms "user equipment" and "UE" are used in this patent document to refer to remote wireless devices that wirelessly access the gNB, no matter whether the UE is a mobile device (such as a mobile phone or a smart phone) or a fixed device (such as a desktop computer or a vending machine).

A gNB 102 provides wireless broadband access to the network 130 for a first plurality of User Equipments (UEs) within a coverage area 120 of gNB 102. The first plurality of UEs include a UE 111, which may be located in a Small Business (SB); a UE 112, which may be located in an enterprise (E); a UE 113, which may be located in a wireless fidelity (Wi-Fi) Hotspot (HS); a UE 114, which may be located in a first residence (R); a UE 115, which may be located in a second residence (R); a UE 116, which may be a mobile device (M), such as a cellular phone, a wireless laptop computer, a wireless personal digital assistant (PDA), etc. gNB 103 provides wireless broadband access to network 130 for a second plurality of UEs within a coverage area 125 of gNB 103. The second plurality of UEs include a UE 115 and a UE 116. In some embodiments, one or more of gNBs 101-103 can communicate with each other and with UEs 111, 112, 113, 114, 115, and 116 using 5G, Long Term Evolution (LTE), long term evolution advanced (LTE-A), worldwide interoperability for microwave access (WiMAX) or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of gNB 101, gNB 102, and gNB 103 include a two-dimensional (2D) antenna array as described in embodiments of the disclosure. In some embodiments, one or more of gNB 101, gNB 102, and gNB 103 support codebook designs and structures for systems with 2D antenna arrays.

Although FIG. 1 illustrates an example of the wireless network 100, various changes can be made to FIG. 1. The wireless network 100 can include any number of gNBs and any number of UEs in any suitable arrangement, for example. Furthermore, gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, gNB 101, 102 and/or 103 can provide access to other or additional external networks, such as external telephone networks or other types of data networks.

Figure 2A:
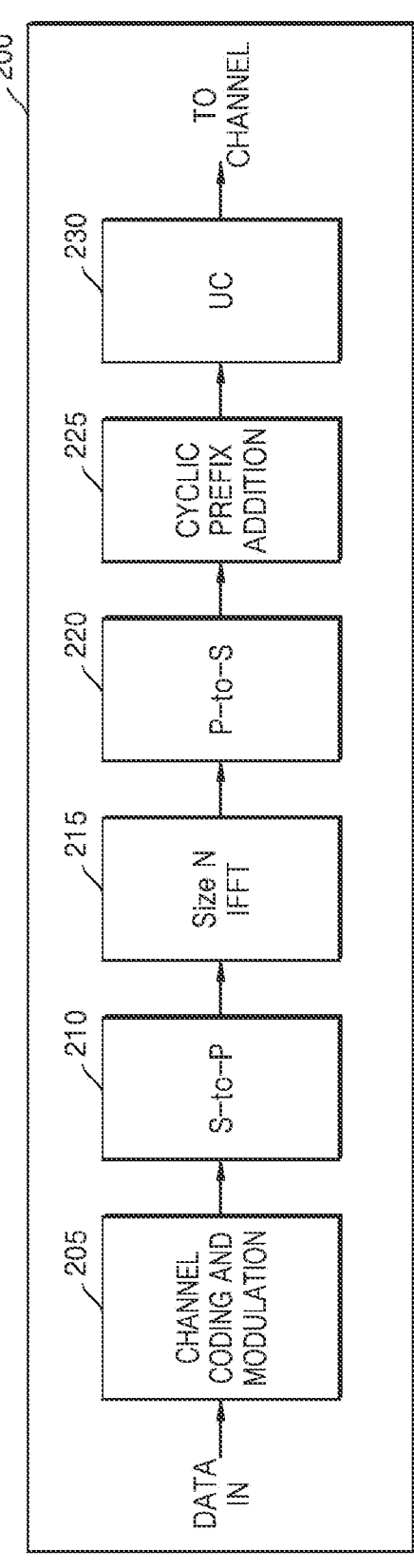
FIGS. 2A and 2B illustrate a block diagram of wireless transmission and reception paths according to various embodiments of the disclosure.
Figure 2B:
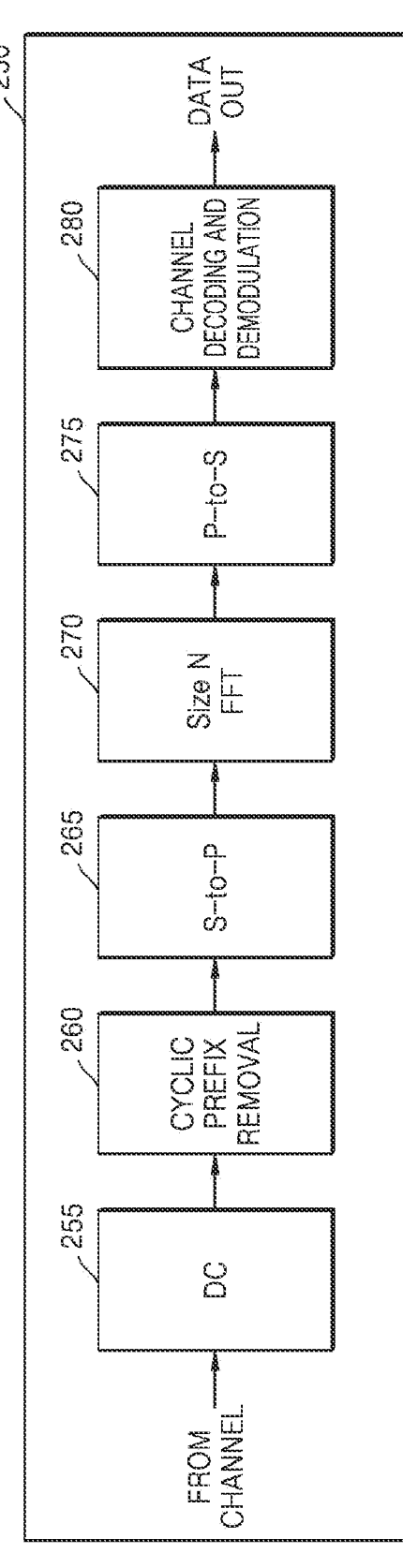

FIGS. 2A and 2B illustrate wireless transmission and reception paths according to various embodiments of the disclosure.

In the following description, the transmission path 200 can be described as being implemented in a gNB, such as gNB 102, and the reception path 250 can be described as being implemented in a UE, such as UE 116. However, it should be understood that the reception path 250 can be implemented in a gNB and the transmission path 200 can be implemented in a UE. In some embodiments, the reception path 250 is configured to support codebook designs and structures for systems with 2D antenna arrays as described in embodiments of the disclosure.

The transmission path 200 includes a channel coding and modulation block 205, a Serial-to-Parallel (S-to-P) block 210, a size N Inverse Fast Fourier Transform (IFFT) block 215, a Parallel-to-Serial (P-to-S) block 220, a cyclic prefix addition block 225, and an up-converter (UC) 230. The reception path 250 includes a down-converter (DC) 255, a cyclic prefix removal block 260, a Serial-to-Parallel (S-to-P) block 265, a size N Fast Fourier Transform (FFT) block 270, a Parallel-to-Serial (P-to-S) block 275, and a channel decoding and demodulation block 280.

In the transmission path 200, the channel coding and modulation block 205 receives a set of information bits, applies coding (such as Low Density Parity Check (LDPC) coding), and modulates the input bits (such as using Quadrature Phase Shift Keying (QPSK) or Quadrature Amplitude Modulation (QAM)) to generate a sequence of frequency-domain modulated symbols. The Serial-to-Parallel (S-to-P) block 210 converts (such as demultiplexes) serial modulated symbols into parallel data to generate N parallel symbol streams, where N is a size of the IFFT/FFT used in gNB 102 and UE 116. The size N IFFT block 215 performs IFFT operations on the N parallel symbol streams to generate a time-domain output signal. The Parallel-to-Serial block 220 converts (such as multiplexes) parallel time-domain output symbols from the Size N IFFT block 215 to generate a serial time-domain signal. The cyclic prefix addition block 225 inserts a cyclic prefix into the time-domain signal. The up-converter 230 modulates (such as up-converts) the output of the cyclic prefix addition block 225 to an RF frequency for transmission via a wireless channel. The signal can also be filtered at a baseband before switching to the RF frequency.

The RF signal transmitted from gNB 102 arrives at UE 116 after passing through the wireless channel, and operations in reverse to those at gNB 102 are performed at UE 116. The down-converter 255 down-converts the received signal to a baseband frequency, and the cyclic prefix removal block 260 removes the cyclic prefix to generate a serial time-domain baseband signal. The Serial-to-Parallel block 265 converts the time-domain baseband signal into a parallel time-domain signal. The Size N FFT block 270 performs an FFT algorithm to generate N parallel frequency-domain signals. The Parallel-to-Serial block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a reception path 250 similar to that for receiving from UEs 111-116 in the uplink. Similarly, each of UEs 111-116 may implement a transmission path 200 for transmitting to gNBs 101-103 in the uplink, and may implement a reception path 250 for receiving from gNBs 101-103 in the downlink.

Each of the components in FIGS. 2A and 2B can be implemented using only hardware, or using a combination of hardware and software/firmware. As a specific example, at least some of the components in FIGS. 2A and 2B may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the disclosure. Other types of transforms can be used, such as Discrete Fourier transform (DFT) and Inverse Discrete Fourier Transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2A and 2B illustrate examples of wireless transmission and reception paths, various changes may be made to FIGS. 2A and 2B. For example, various components in FIGS. 2A and 2B can be combined, further subdivided or omitted, and additional components can be added according to specific requirements. Furthermore, FIGS. 2A and 2B are intended to illustrate examples of types of transmission and reception paths that can be used in a wireless network. Any other suitable architecture can be used to support wireless communication in a wireless network.

Figure 3A:
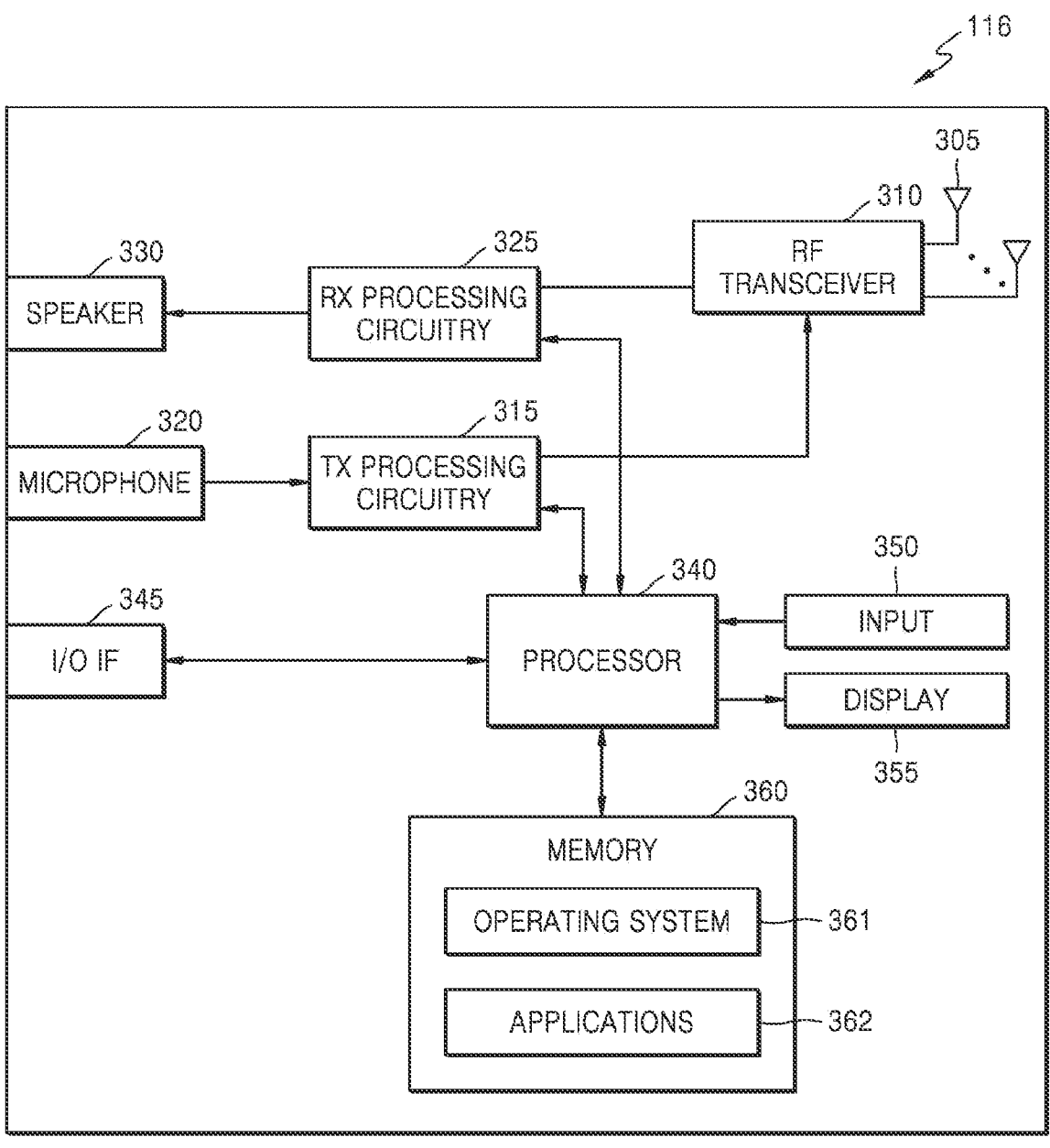
FIG. 3A illustrates a block diagram of a UE according to an embodiment of the disclosure.

FIG. 3A illustrates a UE 116 according to an embodiment of the disclosure. The embodiment of UE 116 shown in FIG. 3A is for illustration only, and UEs 111-115 of FIG. 1 can have the same or similar configuration. However, a UE has various configurations, and FIG. 3A does not limit the scope of the disclosure to any specific implementation of the UE.

UE 116 includes an antenna 305, a radio frequency (RF) transceiver 310, a transmission (TX) processing circuit 315, a microphone 320, and a reception (RX) processing circuit 325. UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute an OS 361 stored in the memory 360 in order to control the overall operation of UE 116. For example, the processor/controller 340 can control the reception of forward channel signals and the transmission of backward channel signals through the RF transceiver 310, the RX processing circuit 325 and the TX processing circuit 315 according to well-known principles. In some embodiments, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in embodiments of the disclosure. The processor/controller 340 can move data into or out of the memory 360 as required by an execution process. In some embodiments, the processor/ controller 340 is configured to execute the application 362 based on the OS 361 or in response to signals received from the gNB or the operator. The processor/controller 340 is also coupled to an I/O interface 345, where the I/O interface 345 provides UE 116 with the ability to connect to other devices such as laptop computers and handheld computers. I/O interface 345 is a communication path between these accessories and the processor/controller 340.

The processor/controller 340 is also coupled to the input device(s) 350 and the display 355. An operator of UE 116 can input data into UE 116 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3A illustrates an example of UE 116, various changes can be made to FIG. 3A. For example, various components in FIG. 3A can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Furthermore, although FIG. 3A illustrates that the UE 116 is configured as a mobile phone or a smart phone, UEs can be configured to operate as other types of mobile or fixed devices.

Figure 3B:
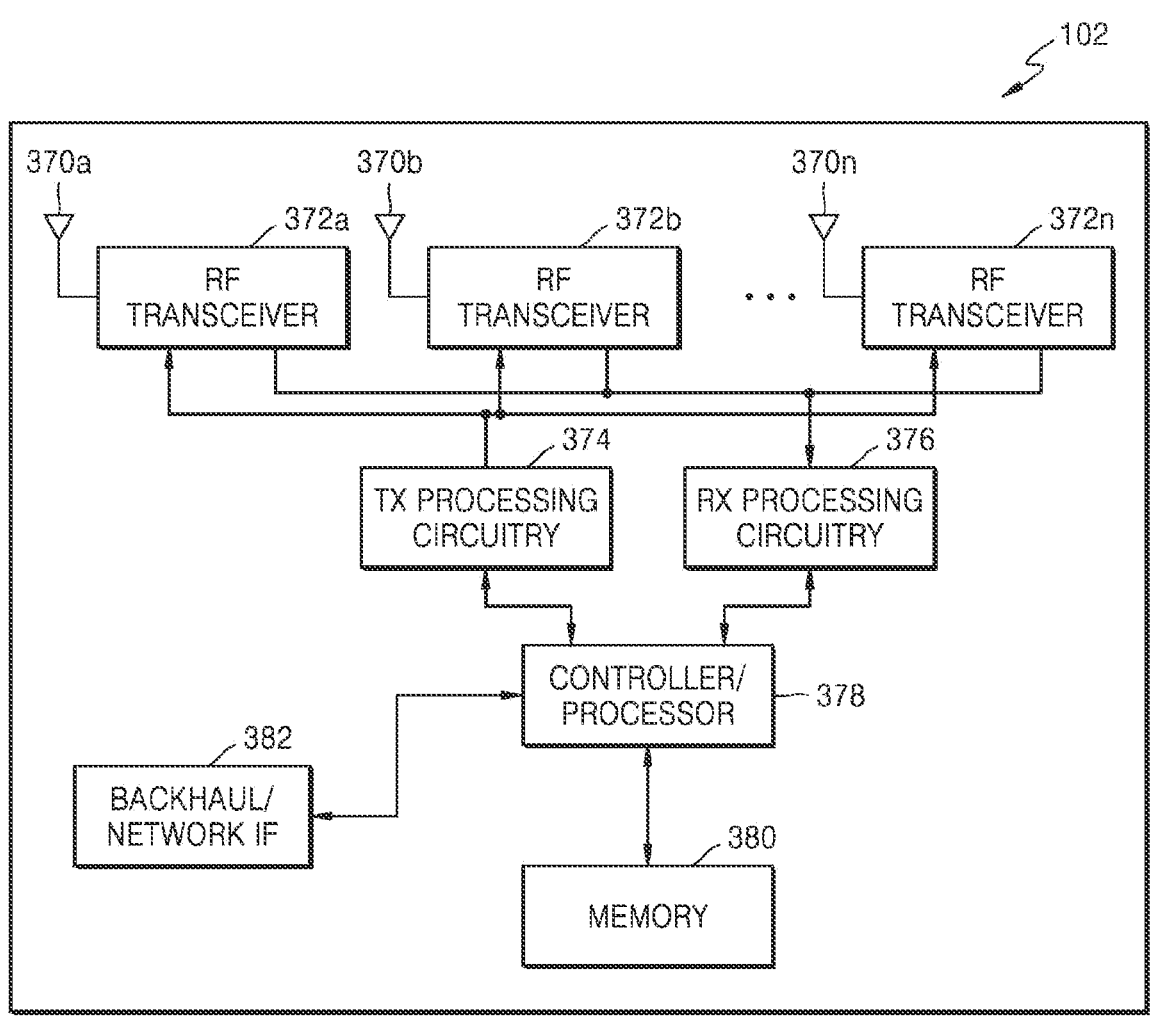
FIG. 3B illustrates a block diagram of a gNodeB (gNB) according to an embodiment of the disclosure.

FIG. 3B illustrates a gNB 102 according to an embodiment of the disclosure. The embodiment of gNB 102 shown in FIG. 3B is for illustration only, and other gNBs of FIG. 1 can have the same or similar configuration. However, a gNB has various configurations, and FIG. 3B does not limit the scope of the disclosure to any specific implementation of a gNB. It should be noted that gNB 101 and gNB 103 can include the same or similar structures as gNB 102.

Referring to FIG. 3B, gNB 102 includes a plurality of antennas 370a, 370b . . . 370n, a plurality of RF transceivers 372a, 372b, . . . 372n, a transmission (TX) processing circuit 374, and a reception (RX) processing circuit 376. In certain embodiments, one or more of the plurality of antennas 370a-370n include a 2D antenna array. The gNB 102 also includes a controller/processor 378, a memory 380, and a backhaul or network interface 382.

RF transceivers 372a-372n receive an incoming RF signal from antennas 370a-370n, such as a signal transmitted by UEs or other gNBs. RF transceivers 372a-372n down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, email or interactive video game data) from the controller/processor 378. TX processing circuit 374 encodes, multiplexes and/or digitizes outgoing baseband data to generate a processed baseband or IF signal. RF transceivers 372a-372n receive the outgoing processed baseband or IF signal from TX processing circuit 374 and up-convert the baseband or IF signal into an RF signal transmitted via antennas 370a-370n.

The controller/processor 378 can include one or more processors or other processing devices that control the overall operation of gNB 102. For example, the controller/processor 378 can control the reception of forward channel signals and the transmission of backward channel signals through the RF transceivers 372a-372n, the RX processing circuit 376 and the TX processing circuit 374 according to well-known principles. The controller/processor 378 can also support additional functions, such as higher-level wireless communication functions. For example, the controller/processor 378 can perform a Blind Interference Sensing (BIS) process such as that performed through a BIS algorithm, and decode a received signal from which an interference signal is subtracted. A controller/processor 378 may support any of a variety of other functions in gNB 102. In some embodiments, the controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described in embodiments of the disclosure. In some embodiments, the controller/processor 378 supports communication between entities such as web real-time communications (RTCs). The controller/processor 378 can move data into or out of the memory 380 as required by an execution process.

The controller/processor 378 is also coupled to the backhaul or network interface 382. The backhaul or network interface 382 allows gNB 102 to communicate with other devices or systems through a backhaul connection or through a network. The backhaul or network interface 382 can support communication over any suitable wired or wireless connection(s). For example, when gNB 102 is implemented as a part of a cellular communication system, such as a cellular communication system supporting 5G or new radio access technology or NR, LTE or LTE-A, the backhaul or network interface 382 can allow gNB 102 to communicate with other gNBs through wired or wireless backhaul connections. When gNB 102 is implemented as an access point, the backhaul or network interface 382 can allow gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 can include a RAM, while another part of the memory 380 can include a flash memory or other ROMs. In certain embodiments, a plurality of instructions, such as the BIS algorithm, are stored in the memory. The plurality of instructions are configured to cause the controller/processor 378 to execute the BIS process and decode the received signal after subtracting at least one interference signal determined by the BIS algorithm.

As will be described in more detail below, the transmission and reception paths of gNB 102 (implemented using RF transceivers 372a-372n, TX processing circuit 374 and/or RX processing circuit 376) support aggregated communication with FDD cells and TDD cells.

Although FIG. 3B illustrates an example of gNB 102, various changes may be made to FIG. 3B. For example, gNB 102 can include any number of each component shown in FIG. 3A. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, gNB 102 can include multiple instances of each (such as one for each RF transceiver).

The wireless communication is one of the most successful innovations in modern history. Recently, the number of subscribers to wireless communication services exceeded 5 billion and continues to grow rapidly. The demand for wireless data services is growing rapidly due to the increasing popularity of smartphones and other mobile data devices (e.g., tablets, notebook computers, netbooks, e-book readers, and machine-type devices) among consumers and businesses. In order to meet the rapid growth of mobile data services and support new applications and deployments, it is critical to improve the efficiency and coverage of wireless interfaces.

Maximum Sensitivity Degradation (MSD) was introduced from Long Term Evolution (LTE), and continued to Carrier Aggregation (CA) and Dual Connectivity (DC) of New Radio (NR), and it is used to quantify the maximum allowable sensitivity deterioration value when the receiving Chain is interfered by the transmitting Chain, wherein the interference sources include harmonic interference, cross-band interference, and intermodulation interference caused by dual uplinks. Due to different frequency band configurations and interference types, the value of MSD may range from single-digit dB to more than 30 dB, but there are also many band combinations (BC) that do not have interference problems. The MSD defined in the 3rd Generation Partnership Project (3GPP) specification is the worst case in conduction calculated based on generally accepted RF parameters (such as antenna isolation of 10 dB and printed circuit board isolation of 60~70 dB) under specific conditions, that is, the minimum requirement that User Equipment (UE) needs to meet. However, it was found in actual tests that some BCs did not have significant sensitivity degradation, or even some did not have a sensitivity degradation, and the large MSD in the 3GPP specification may cause operators to have concerns when using the BC, or the network becomes inefficient when scheduling and configuring the BC, and even for some BCs, no matter how small the UE's actual MSD is, the network does not configure the BC, which is obviously inappropriate.

Figure 3C:
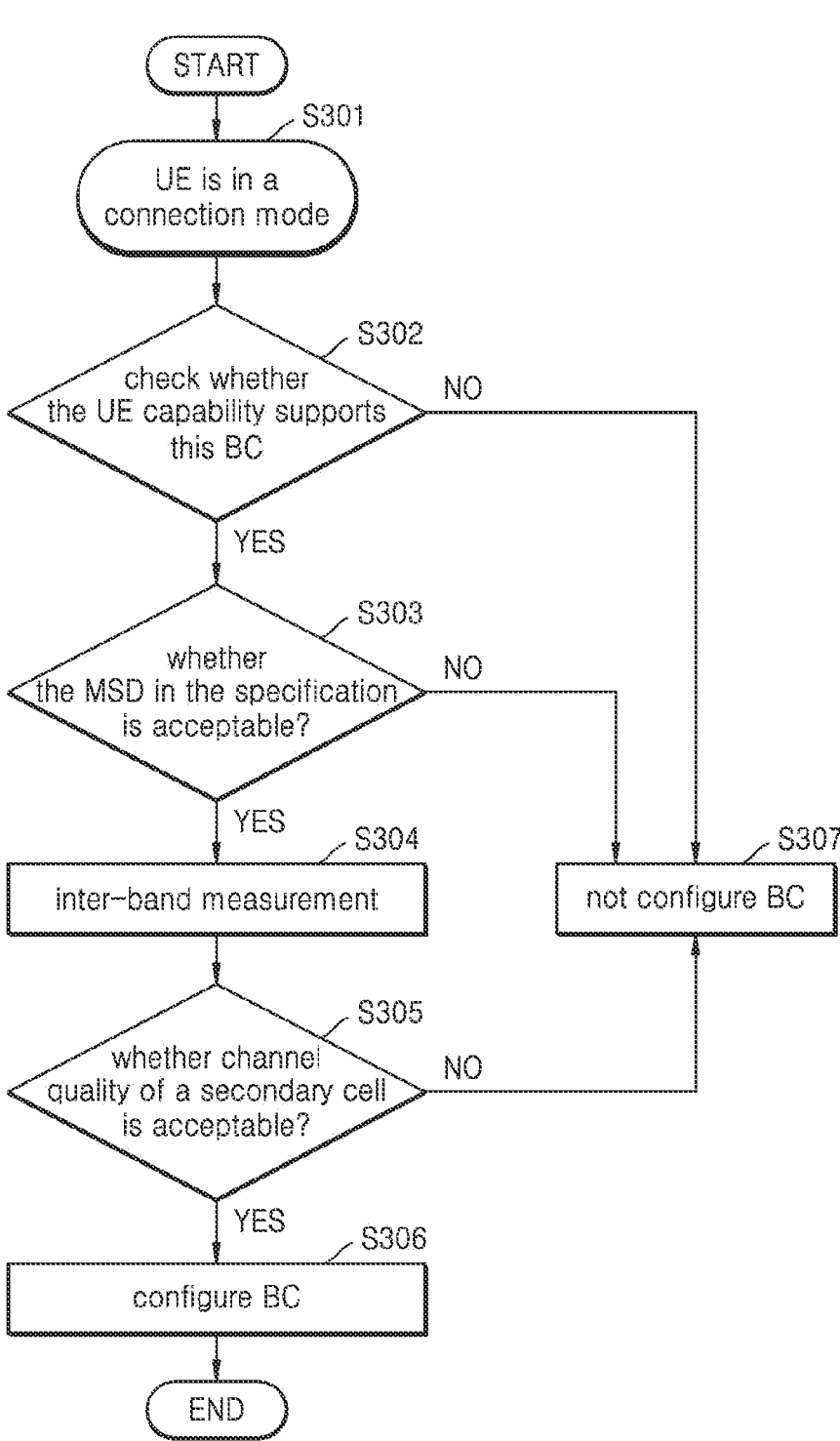
FIG. 3C is a flow chart of an existing network configuring a band combination (BC) for a UE according to an embodiment of the disclosure.

FIG. 3C is a schematic diagram of an existing network configuring a BC for a UE according to an embodiment of the disclosure.

Referring to FIG. 3C, when a UE is in a connection mode (i.e., a primary cell is connected, and the primary cell may correspond to a band within the BC) according to operation S301, the network checks whether the UE capability supports the BC according to in operation S302, and if not, the BC is not configured according to operation S307. If the UE supports this BC, proceeding to the next step, for example, the network can judge whether the MSD in the specification is acceptable, by looking up a table or other methods according to operation S303. If the MSD is not acceptable, the BC is not configured according to operation S307. If the MSD in the specification is acceptable, inter-band measurement can be performed according to operation S304 to judge channel quality of a secondary cell according to operation S305. If the channel quality does not meet a requirement according to operation S305, the BC is not configured according to operation S307. Otherwise, if the channel quality of the secondary cell meets the requirement, the BC is configured according to operation S306.

It is not difficult to see from the above process that the network may occasionally think that the UE will have a large MSD as specified in the specification in actual work. The worst case is that no matter what the scenario is, even if the actual MSD of certain BCs of the UE ("Actual MSD" as used herein refers to the actual MSD value of this UE obtained in a conduction test, which is the maximum value of the sensitivity deterioration measured in the conduction test, that is, the worst case) is small or even 0, the network will not configure the BCs. However, as mentioned in the background art, it is found that certain BCs do not have large sensitivity deterioration in actual tests, and even some did not have the sensitivity deterioration. For example, the test results of commercial UEs have shown that: for some BCs, the actual MSD is more than 20 db better than the MSD in the 3GPP specification, and there is even no deterioration in sensitivity. In the field test, it is also difficult to find the large sensitivity deterioration in certain BCs.

Simulation and test data can demonstrate, for example, sensitivity improvement can be observed in the following cases, and the improvement can be as high as 20 db or more:

1) Adopting RF front-end devices with better performance (such as power amplifiers, filters with better harmonic suppression, etc.), higher printed circuit board isolation, higher antenna isolation, and chips with a higher integration, etc.

2) The uplink transmit power is less than the maximum rated output transmit power specified in the specification;

3) Some regions/countries have no interference issues in their holding spectrum, or there is no or only minor interference in a configured band.

However, the MSD for each band combination defined in the 3GPP specification is the minimum requirement that the UE needs to meet for each band combination, and is calculated in the worst case in conduction, which is the MSD allowed by the UE for each band combination or a band in each band combination. However, in the practice, the actual MSD for certain BC(s) or band(s) in certain BC(s) is likely to be less than the maximum value, and therefore, it is not appropriate to use this maximum value as a criterion for judging whether the network configures a certain BC or not for the UE.

In addition, even if the network considers the MSD in the specification to be acceptable, when performing the inter-band measurement, there may be a worst-case, that is, a transmission link of a primary cell may be turned off during a test, and at this time, interference of the uplink of the primary cell to the downlink of a secondary cell, or an intermodulation interference caused by a dual uplink of the primary and secondary cells falling into the secondary cell may not be included in an evaluation of the channel quality of the secondary cell, thus, it is possible that the estimated channel quality at this time is inaccurate. Even if the secondary cell is connected to the network, it may be deactivated after being connected because it suffers too much interference and the channel quality does not meet the requirements.

Therefore, the disclosure proposes to introduce Low MSD capability to help the network better configure the BC, and at the same time, it can also facilitate the operator to identify a BC that may have a problem.

In this paper, a UE having the Low MSD capability for a certain BC or a certain band within the certain BC indicates that: for this BC or this band within the BC, the UE supports a lower MSD than the MSD already defined in the specification (that is, the allowed MSD of the UE in the current specification for this BC or this band within the BC). The UE not having the Low MSD capability indicates that: for this BC or this band within the band combination, the UE does not support second MSD lower than the MSD already defined in the specification (hereinafter, the MSD already defined in the specification is also referred to as the first MSD).

Figure 4:
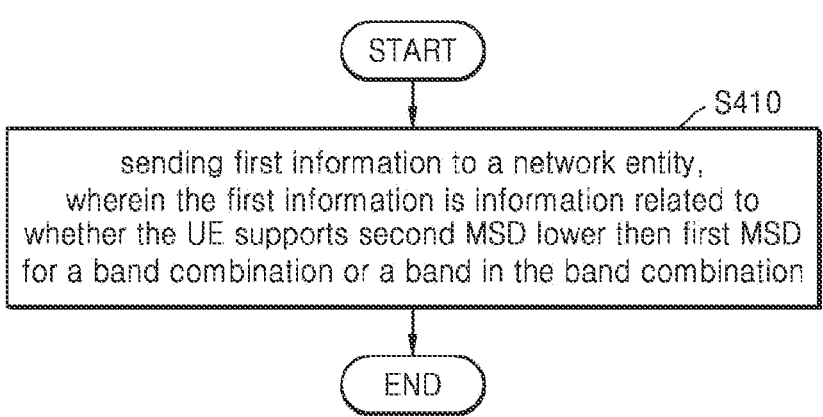
FIG. 4 is a flowchart of a wireless communication method performed by a User Equipment (UE) according to an embodiment of the disclosure.

For the convenience of understanding, the content related to UE reporting the Low MSD capability is first introduced in conjunction with the wireless communication method performed by the user equipment in FIG. 4.

FIG. 4 is a flowchart of a wireless communication method performed by a User Equipment (UE) according to an embodiment of the disclosure.

Referring to FIG. 4, at operation S410, first information is sent to a network entity. That is, the first information is reported to the network entity. Here, the first information may be information related to whether the UE supports second MSD lower than the first MSD for a band combination or a band within the band combination. For example, the first MSD could be the allowed MSD of the UE for the band combination or the band within the band combination. The first MSD could be MSD defined for the band combination or the band within the band combination in the current 3GPP specification.

As an example, the first information may include at least one of: information indicating whether the UE supports the second MSD for the band combination or the band within the band combination; and information related to actual MSD of the UE for the band combination.

According to an embodiment, alternatively, the wireless communication method shown in FIG. 4 further includes: determining the information related to the actual MSD according to the actual MSD of the UE for the band combination; and/or, determining information indicating whether the UE supports the second MSD for the band combination or the band within the band combination, according to the information related to the actual MSD of the UE for the band combination and/or second MSD threshold information related to the band combination; and/or determining the information indicating whether the UE supports the second MSD for the band combination or the band within the band combination, according to location information of the UE.

Specifically, for example, the determining of the information indicating whether the UE supports the second MSD for the band combination or the band within the band combination, according to the information related to the actual MSD of the UE for the band combination and/or the second MSD threshold information related to the band combination, includes: if the MSD caused by each interference source in each band in the band combination is within a respective second MSD threshold range, determining that the UE supports the second MSD for the band combination; if the MSD caused by each interference source in the band in the band combination is within the respective second MSD threshold range, determining that the UE supports the second MSD for the band in the band combination; if a statistic value related to a sum of the MSD caused by all interference sources in each band within the band combination is within a corresponding second MSD threshold, determining that the UE supports the second MSD for the band within the band combination.

For example, the determining of the information indicating whether the UE supports the second MSD, according to location information of the UE, includes: if it is determined according to the location information of the UE that there is no sensitivity deterioration problem in spectrum of the band combination in a country or a region where the UE is located, determining that the UE supports the second MSD for the band combination.

The above information indicating whether the UE supports the second MSD for the band combination or the band within the band combination is information indicating whether the UE has the Low MSD capability for the band combination or the band within the band combination. That is, the information indicating whether the UE has the Low MSD capability may be reported per band combination, or per band per band combination. Meanwhile, the Low MSD capability is optional, and for a certain band combination or a certain band within the certain band combination, if the UE reports that it supports the second MSD, it indicates that the UE has the Low MSD capability for this band combination or this band within the band combination. At this time, the information indicating whether the UE supports the second MSD may be, for example, flag information indicating that the Low MSD capability is true. Conversely, for the certain band combination or the certain band within the certain band combination, if the UE does not indicate supporting the second MSD, that is the Low MSD capability is absent, it indicates that the UE does not has the Low MSD capability for this band combination or this band within the band combination. However, alternatively, the UE could also report information indicating that the UE does not support the second MSD for this band combination or this band within the band combination, wherein, the information indicating that the UE does not support the second MSD could be, for example, flag information indicating that the Low MSD capability is absent or false.

According to an embodiment, the information related to the actual MSD includes: information related to absolute actual MSD of the UE for the band combination; and/or information related to relative actual MSD of the UE for the band combination, wherein, the information related to the relative actual MSD is obtained based on the information related to the absolute actual MSD and/or the first MSD. For example, the information related to the relative actual MSD includes a difference or ratio between the information related to the absolute actual MSD and the first MSD; or, a value determined according to the difference or ratio.

As an example, the information related to the actual MSD may include: the information related to the actual MSD of the UE caused by each interference source in each band in the band combination; or the information related to the actual MSD of the UE for each band in the band combination. That is to say, according to an embodiment, the UE may report the actual MSD related information according to each interference source/each band/each band combination (per interference source per band per band combination), or report the actual MSD related information according to each band/each band combination (per band per band combination).

As mentioned above, the actual MSD related information may be either the information related to the absolute actual MSD or the information related to the relative actual MSD. Thus, the information related to the actual MSD of the UE for each interference source in each band in the band combination may include the information related to the absolute actual MSD or the information related to the relative actual MSD of the UE for each interference source in each band in the band combination. For example, herein, the information related to the absolute actual MSD may be an actual MSD value of the UE caused by each interference source in each band within the band combination, and the information related to the relative actual MSD may be a relative value of the actual MSD value with respect to the first MSD (i.e., the MSD value in the specification), for example, a ratio or difference between the actual MSD value and the first MSD, or a value determined based on the difference and ratio. The first MSD is defined according to each interference source in each band in the band combination.

Similarly, the information related to the actual MSD of the UE for each band in the band combination may also include: information related to absolute actual MSD or information related to relative actual MSD for each band in the band combination. For example, herein, the information related to the absolute actual MSD may be a statistic value, which is related to a sum of actual MSD of the UE caused by all interference sources in each band in the band combination, and the information related to the relative actual MSD may be obtained based on the statistic value and the first MSD, for example, may be a difference or ratio between this statistic value and a statistic value corresponding to a sum of first MSD caused by all interference sources in each band in the band combination, or a value obtained based on this difference or ratio. For example, the above statistic value herein may be maximum, median, average, etc.

According to an embodiment, the UE may directly send, to the network, information indicating whether the UE supports the second MSD for a band combination or a certain band in the band combination, that is, directly report to the network whether the UE has a Low MSD capability for the band combination or the band in the band combination. For example, for a certain BC or a certain band in the BC, if the actual MSD is within a specified threshold, or a relative value (for example, ratio or difference) of the actual MSD with respect to the MSD in the specification is within the specified threshold, the UE has the Low MSD capability for the BC or the band in the BC, and thus, the UE may report to the network the Low MSD capability, for example, the UE may send flag information indicating that the Low MSD capability is true to the network entity. Specifically, for example, if there is no MSD problem in the spectrum of a certain BC in a certain country/region, the UE has the Low MSD capability for this BC and may report the Low MSD capability. If there is an MSD problem in the spectrum of a certain BC in the country/region, and if the above threshold condition is met, the UE has the Low MSD capability for the BC or the band in the BC and may report the Low MSD capability. Through this reporting method, the network entity can directly receive, from the UE, information indicating whether the UE supports the second MSD for a band combination or a band in the band combination, so as to directly know whether the UE has the Low MSD capability for the band combination or the band within the band combination. By adopting this reporting method, the network can know the actual MSD capability of the UE to a certain extent, and the signaling overhead is small.

Alternatively, according to another embodiment, the UE may also not directly report to the network whether it has the Low MSD capability, but send the information related to the actual MSD of the UE for the band combination to the network, so that the network entity may determine whether the UE has the Low MSD capability according to the received information related to the actual MSD. For example, for a certain band combination or a certain band in the band combination, the UE may report the actual MSD, or a difference or ratio between the actual MSD and the MSD in the specification (the value/ratio/difference may also be reported as an integer, or as an integer multiple of a Δ value, for example, if the MSD in the specification—the actual MSD=16, 10 or Δ is reported, and if the MSD in the specification—the actual MSD=26 db, 20 or 2Δ is reported; as another example, if the ratio between the MSD in the specification and the actual MSD is between 0-25%, 25% or Δ is reported, and if the ratio is between 25%-50%, 50% or 2Δ may be reported). Finally, the network determines whether the UE has the Low MSD capability for a certain BC or a certain band in the BC, according to the received information related to the actual MSD. By adopting this reporting method, the network can more flexibly determine whether the UE has the Low MSD capability, instead of relying solely on the UE's reporting, and the network will flexibly use the Low MSD capability and its reported information, which may provide more specific and detailed references for subsequent channel quality assessments, for example, the reported information may be used together with the inter-band measurement result as a criterion for judging channel quality of a secondary cell, or used together with other channel quality measurement results as a criterion for determining whether to deactivate the secondary cell.

Alternatively, the UE may not only report to the network whether the UE has the Low MSD capability, but also report the information related to the actual MSD of the UE for the band combination to the network. For a certain BC or a certain band in the BC, if the actual MSD is within a specified threshold range, or the relative value (for example, ratio or difference) of the actual MSD with respect to the MSD in the specification is within the specified threshold range, it is considered, for the BC or the band in the BC, that the UE has the Low MSD capability (that is, the Low MSD capability is true), and the UE may report to the network that the UE has the Low MSD capability, and report the actual MSD value, or the relative value (for example, difference or ratio) of the actual MSD with respect to the MSD in the specification, together. As an example, the actual MSD value, and the ratio/difference of the actual MSD value with respect to the MSD in the specification may also be reported as an integer, or reported as an integer multiple of a certain Δ value, for example, if the MSD in the specification—the actual MSD=16, 10 or Δ is reported, and if the MSD in the specification—the actual MSD=26 db, 20 or 2Δ is reported; as another example, if the ratio is between 0-25%, 25% or Δ may be reported, and if the ratio is between 25%-50%, 50% or 2Δ may be reported. Specifically, for example, if there is no MSD issue in the spectrum of a certain BC of a certain country/region, the UE has and may report the Low MSD capability for this BC, and may report MSD=0 along with the capability. If there is an MSD issue in the spectrum of a certain BC of a certain country/region, and if the above threshold condition is met, the UE has and may report the Low MSD capability for the BC or the band in the BC, and report the actual MSD value, or the relative value of the actual MSD with respect to the MSD in the specification, together. Through this reporting method, the network may intuitively understand the actual performance of the UE, and this information can also provide more specific and detailed references for subsequent channel quality assessments, for example, this information may be used together with the inter-band measurements as a criterion for judging channel quality of a secondary cell, or used together with other channel quality measurement results as a judgment criterion for determining whether to deactivate the secondary cell, but objectively the signaling overhead will be increased.

As an example, the UE may report the first information when the network inquires whether the Low MSD capability is supported. Or, when the network queries the capability of the UE, that is, when querying whether the UE supports a certain BC, the first information is reported together with other information of the BC.

Therefore, according to an embodiment, although not shown in FIG. 4, the wireless communication method performed by the UE shown in FIG. 4 may further include: receiving a message for inquiring whether the UE supports the second MSD, from the network entity. In this case, the sending of the first information to the network entity may include sending a response to the message to the network entity, wherein the first information is included in the response. The disclosure does not limit the type or form of the message used to inquiring whether the UE supports the second MSD and the type or form of the response to the message.

Alternatively, according to an embodiment, although not shown in FIG. 4, the wireless communication method performed by the UE shown in FIG. 4 may further include: receiving a message for inquiring whether the UE supports the band combination from the network entity. In this case, the sending of the first information may to the network entity may include: sending a response to the message to the network entity, wherein, the response includes the first information and second information related to the band combination. Similarly, the disclosure does not limit the type or form of the message for inquiring whether the UE supports the second MSD and the type or form of the response to the message. For example, the second information may be an information set for a certain BC, and the information set may include, for example, information indicating that the BC is supported, information of a bandwidth combination set, and/or basic information about the BC.

As mentioned above, the UE may determine, according to the actual MSD of the UE for the band combination and/or second MSD threshold information related to the band combination, information indicating whether the UE supports the second MSD for the band combination or the band in the band combination, that is, determine whether the UE has the Low MSD capability. For example, for the band combination or the band in the band combination, if the actual MSD is within a specified threshold range, or the relative value (e.g., difference or ratio) of the actual MSD with respect to the MSD in the specification is within the specified threshold range, it is considered that the UE has the Low MSD capability for the BC or the band in the BC.

The above-mentioned second MSD threshold information may be directly defined in the specification, or may be sent by the UE to the network entity so that the network entity determines whether the UE supports the second MSD according to the above-mentioned second MSD threshold information and the information related to the actual MSD received from the UE, that is, determines whether the UE has the Low MSD capability. Alternatively, the above-mentioned second MSD threshold information may be determined by the network. Thus, although not shown, but the wireless communication method performed by the UE shown in FIG. 4 may further include: sending the second MSD threshold information related to the band combination to the network entity. Specifically, for example, the UE may actively report the second MSD threshold information, or, the UE may send the second MSD threshold information in response to an inquiry for the second MSD threshold information from the network entity. For example, the UE may receive a message from the network entity for querying the second MSD threshold information, and send a response to the message to the network entity, wherein, the response may include the second MSD threshold information.

According to an embodiment, the second MSD threshold information may include absolute second MSD threshold information and/or relative second MSD threshold information, wherein the relative second MSD threshold information is obtained based on the absolute second MSD threshold information and/or the first MSD.

Besides, according to an embodiment, the second MSD threshold information may be defined according to each interference source in each band in the band combination (i.e., defined per interference source per band per band combination), or defined according to each band in the band combination (i.e., defined per band per band combination).

The second MSD threshold information being defined according to each interference source in each band in the band combination indicates that the second MSD threshold information is threshold information related to MSD caused by each interference source in each band in the band combination. That is, MSD caused by different interference sources in each band of the band combination have their own thresholds. That is, the threshold information may include threshold information of MSD caused by each interference source in each band in the band combination. Besides, the threshold information may be absolute threshold information or relative threshold information, wherein, the absolute threshold information represents an absolute threshold of MSD caused by each interference source in each band in the band combination, and the relative threshold information represents a relative threshold obtained based on the absolute threshold of this MSD and the first MSD. For example, the relative threshold information here may be a difference or ratio between the absolute threshold of MSD caused by each interference source in each band in the band combination and the first MSD (i.e., the MSD defined in the specification) caused by each interference source in each band in the band combination, or a value determined based on the difference or ratio.

If the MSD caused by each interference source in each band in the band combination is within a respective second MSD threshold range, it is considered that the UE has the Low MSD capability for this band combination and the UE may report the Low MSD capability. Alternatively, if MSD caused by each interference source in a certain band in the band combination is within a respective second MSD threshold range, it is considered that the UE has the Low MSD capability for this band in the band combination and the UE may report the Low MSD capability. If the second MSD threshold information is defined according to each interference source in each band in the band combination, when the UE reports the information related to the actual MSD, the UE reports it per interference source per band per band combination. That is to say, if the second MSD threshold information is defined according to each interference source in each band in the band combination, the information related to the actual MSD is information related to actual MSD of the UE caused by each interference source in each band in the band combination. That is, in this case, the information related to the actual MSD sent by the UE to the network entity is the information related to the actual MSD of the UE for each interference source in each band in the band combination. For example, the UE reports to the network the actual MSD, or the ratio, the difference between the actual MSD and the MSD in the specification, per interference source per band per band combination.

It is a convenient method to define threshold information per interference source per band per band combination, because MSD is also defined per interference source/per band/per band combination in the existing specification, and thus, for the Low MSD proposed in the disclosure, the test frequency points and conditions of the MSD in the specification may be directly adopted, and no redefinition is required.

In addition, when defining the above-mentioned second MSD threshold information per interference source per band per band combination, in the same interference source (interference type), a same threshold or different thresholds may be defined for different orders. For example, in intermodulation interference, the same threshold may be defined or different thresholds may be defined for second-order intermodulation and third-order intermodulation, or a threshold may be defined for the sum of intermodulation interference of all orders.

Alternatively, as described above, the above-mentioned second MSD threshold information may also be defined according to each band in the band combination. The second MSD threshold information being defined according to each band in the band combination indicates that the second MSD threshold information is threshold information related to the sum of MSD caused by all interference sources in each band in the band combination. The threshold information may be absolute threshold information or relative threshold information, for example, the absolute threshold information may be an absolute threshold of a statistic value related to the sum of MSD caused by all interference sources in each band in the band combination, and the relative threshold information may be a relative threshold of the statistic value and the first MSD, which is a relative threshold obtained based on the absolute threshold of the statistic value and the first MSD. Herein, the statistic value may be maximum, median, average, etc. For example, the relative threshold information here may be a difference or radio between the absolute threshold of the maximum value of the sum of MSD caused by all interference sources in each band in the band combination and the maximum value of the sum of first MSD caused by all interference sources in each band in the band combination, or a value determined based on the difference or radio.

If the statistic value (e.g., the maximum) related to the sum of the MSD caused by all interference sources in each band in the band combination is within a corresponding second MSD threshold range, it is considered that the UE has the Low MSD capability for this band combination, and the UE may report the Low MSD capability. Alternatively, if the statistic value (e.g., the maximum) related to the sum of MSD caused by all interference sources in a certain band in the band combination is within a corresponding second MSD threshold range, it is considered that the UE has the Low MSD capability for this band in the band combination and the UE may report the Low MSD capability. If the second MSD threshold information is defined according to each band in the band combination, when the UE reports the information related to the actual MSD, the UE also reports it per band per band combination. That is, if the second MSD threshold information is defined according to each band in the band combination, the information related to the actual MSD is information related to actual MSD of the UE for each band in the band combination. That is, in this case, the information related to the actual MSD sent by the UE to the network entity is the information related to the actual MSD of the UE for each band in the band combination. For example, the UE may report to the network the actual MSD or the ratio, the difference between the actual MSD and the MSD in the specification, per band per band combination.

The advantage of defining the threshold information per band per band combination is: when there are multiple interference types in a certain band of a certain BC, the total MSD in each band may be more intuitively indicated by using this method.

In addition, in the method defining the threshold per band per band combination, different bands may have the same threshold or different thresholds. For example, low frequency may have one threshold, mid-high frequency may have one threshold, and ultra-high frequency may have one threshold. In addition, the threshold information can be one value or one set, and the one set can be understood as having multiple threshold levels, and meeting different threshold levels can be considered as having different Low MSD capability levels.

For the convenience of understanding, the way of defining the above-mentioned second MSD threshold information and the use of the above-mentioned second MSD threshold information are further described through examples hereinafter.

There may be one or more bands in one BC, and there may be different interference sources (also called interference types) in each band. Hereinafter, we take the band combination CA_A-B (which includes band A and band B) as an example to illustrate the above-mentioned different threshold definitions and permutations of different threshold values. Assuming that CA_A-B supports dual uplinks, A's uplink has harmonic interference to B's downlink, and the intermodulation interference generated by A's uplink and B's uplink falls within A's downlink band and B's downlink band, that is, there is intermodulation interference in the downlink band of A, and there are both harmonic interference and intermodulation interference in the downlink band of B.

As an example, under the above assumption, if the above-mentioned second MSD threshold information is the second MSD threshold information defined per interference source per band per band combination, and the method of reporting the Low MSD capability is reporting per BC, and it is assumed that the threshold of MSD caused by intermodulation interference is T1, and the threshold of MSD caused by harmonic interference is T2, for example, when the actual MSD caused by the intermodulation interference in the downlink of A or a difference or ratio between the actual MSD and the MSD defined in the specification is less than T1, meanwhile in the downlink of B, the actual MSD caused by the intermodulation interference or the difference or ratio between the actual MSD and the MSD defined in the specification is less than T1, and the actual MSD caused by the harmonic interference or the difference or ratio between the actual MSD and the MSD defined in the specification is less than T2, that is, when MSD caused by a different interference source in the band A and the band B can meet the corresponding thresholds, it can be determined that the UE has the Low MSD capability for this band combination and the UE could report the Low MSD capability (that is, reporting information indicating that the UE has the Low MSD capability, that is, information indicating that the UE supports the second MSD).

As an example, under the above assumption, if the above-mentioned second MSD threshold information is the second MSD threshold information defined per interference source per band per band combination, and the method of reporting the Low MSD capability is reporting per band per BC, and it is assumed that the threshold of MSD caused by the intermodulation interference is T1, and the threshold of MSD caused by the harmonic interference is T2, for example, when the actual MSD caused by the intermodulation interference in the downlink of A or a difference or ratio between the actual MSD and the MSD defined in the specification is less than T1, it is considered that it could be determined that the UE has the Low MSD capability for the band A in this band combination and the UE could report the Low MSD capability; and when in the downlink of B, the actual MSD caused by the intermodulation interference or the difference or ratio between the actual MSD and the MSD defined in the specification is less than T1, meanwhile the actual MSD caused by the harmonic interference or the difference or ratio between the actual MSD and the MSD defined in the specification is less than T2, that is, when all MSD caused by different interference sources in the band B meet corresponding thresholds, it is considered that it could be determined that the UE has the Low MSD capability for the band B in this band combination and the UE may report the Low MSD capability (that is, reporting information indicating that the UE has the Low MSD capability, that is, information indicating that the UE supports the second MSD).

As an example, under the above assumption, if the above-mentioned second MSD threshold information is the second MSD threshold information defined per band per band combination, and the method of reporting the Low MSD capability is reporting per BC, and it is assumed that the threshold of the maximum of the sum of MSD caused by all interference sources in the band A is T3, and the threshold of the maximum of the sum of MSD caused by all interference sources in the band B is also T3, when the maximum of the sum of actual MSD caused by all the interference sources (i.e., intermodulation interference) in the band A is less than the threshold T3, and the maximum of the sum of actual MSD caused by all the interference sources (i.e., harmonic interference+intermodulation interference) in the band B is less than the threshold T3, it could be determined that the UE has the Low MSD capability for this band combination and the UE could report the Low MSD capability (that is, reporting information indicating that the UE has the Low MSD capability, that is, information indicating that the UE supports the second MSD).

As an example, under the above assumption, if the above-mentioned second MSD threshold information is the second MSD threshold information defined per band per band combination, and the method of reporting the Low MSD capability is reporting per band per BC, and it is assumed that the threshold of the maximum of the sum of MSD caused by all interference sources in the band A is T3, and the threshold of the maximum of the sum of MSD caused by all interference sources in the band B is also T3, when the maximum of the sum of actual MSD caused by all the interference sources (i.e., intermodulation interference) in the band A is less than the threshold T3, it could be determined that the UE has the Low MSD capability for the band A in this band combination and the UE may report the Low MSD capability; when the maximum of the sum of actual MSD caused by all the interference sources (harmonic interference+intermodulation interference) in the band B is less than the threshold T3, it could be determined that the UE has the Low MSD capability for the band B in this band combination and the UE could report the Low MSD capability (that is, reporting information indicating that the UE has the Low MSD capability, that is, information indicating that the UE supports the second MSD).

In the above, the content related to the Low MSD capability has been described with reference to FIG. 4 and in conjunction with examples. According to the wireless communication method shown in FIG. 4, since the UE can send the first information (the first information is information related to whether the UE supports the second MSD less than the first MSD for a band combination or a band in the band combination) to the network entity, so that it is convenient for the network entity to use the first information to configure the band combination for the UE or not configure the band combination for the UE. The reporting of the first information can help the network to better know the actual MSD of the UE, thereby helping the network to configure the band combination more flexibly and accurately. In addition, the network may use the first information reported by the UE together with the inter-band measurement to evaluate channel quality of a secondary cell. In addition, after configuring and activating a certain BC, the first information can also be used as an evaluation criterion for deactivating the secondary cell together with other channel measurement results, so that the operator could identify the BC with interference problem.

Hereinafter, a wireless communication method performed by a network entity will be described with reference to FIG. 5.

Figure 5:
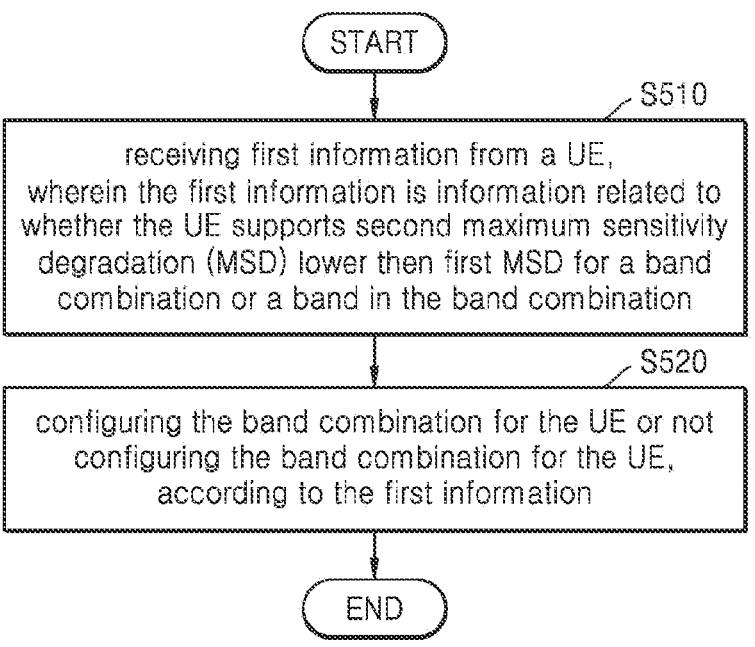
FIG. 5 is a flowchart of a wireless communication method performed by a network entity according to an embodiment of the disclosure.

FIG. 5 is a flowchart of the wireless communication method performed by the network entity according to an embodiment of the disclosure.

At operation S510, first information is received from the UE. Herein, the first information may be information related to whether the UE supports second maximum sensitivity degradation (MSD) lower than first MSD for a band combination or a band in the band combination. For example, the first MSD may be allowed MSD of the UE for the band combination or the band within the band combination. The first MSD may be MSD defined for the band combination or the band within the band combination in the current 3GPP specification. Furthermore, the network entity may receive the first information from the UE in a case the UE is in a connection mode (i.e., a case that a primary cell serving the UE has been connected). Here, the primary cell may correspond to a first band in the band combination.

As an example, the first information may include at least one of: information indicating whether the UE supports the second MSD for the band combination or the band within the band combination; and information related to actual MSD of the UE for the band combination.

According to an embodiment, the information related to the actual MSD includes: information related to absolute actual MSD of the UE for the band combination; and/or information related to relative actual MSD of the UE for the band combination, wherein, the information related to the relative actual MSD is obtained based on the information related to the absolute actual MSD and/or the first MSD.

Besides, as an example, the information related to the actual MSD may include: the information related to the actual MSD of the UE caused by each interference source in each band in the band combination; or the information related to the actual MSD of the UE for each band in the band combination.

Since the content involved in the first information has been described in detail in the above description about FIG. 4, it will not be repeated here, and the relevant content may refer to the corresponding content above.

As mentioned in the description of FIG. 4, according to an embodiment, the UE may directly send, to the network, information indicating whether the UE supports the second MSD for a band combination or a band in the band combination, that is, directly report to the network whether the UE has a Low MSD capability for the band combination or the band in the band combination. Thus, the network entity may directly receive from the UE the information indicating whether the UE supports the second MSD for the band combination or the band in the band combination, so that directly know whether the UE has the Low MSD capability for the band combination or the band in the band combination.

Alternatively, according to another embodiment, the UE may also not directly report to the network whether it has the Low MSD capability, but send the information related to the actual MSD of the UE for the band combination to the network, so that the network entity may determine whether the UE has the Low MSD capability according to the received information related to the actual MSD. Thus, the network entity may directly receive from the UE the information related to the actual MSD of the UE for the band combination, so that the network entity can more flexibly determine whether the UE has the Low MSD capability according to the information related to the actual MSD, instead of relying only on the report of the UE.

Alternatively, according to another embodiment, as described above, the UE may not only report to the network whether the UE has the Low MSD capability, but also report the information related to the actual MSD of the UE for the band combination to the network. Therefore, correspondingly, the network entity can not only receive information indicating whether the UE has Low MSD capability from the UE, but also receive the information related to the actual MSD of the UE for the band combination from the UE, so that the network entity can understand the actual performance of the UE more intuitively and specifically, and this information can also provide a more specific and detailed reference for the channel quality assessment.

As mentioned in the description of FIG. 4, the UE may report the first information when the network inquires whether the Low MSD capability is supported. Or, when the network queries the capability of the UE, that is, when querying whether the UE supports a certain BC, the first information is reported together with other information of the BC.

Therefore, according to an embodiment, although not shown in FIG. 5, the wireless communication method performed by the network entity shown in FIG. 5 may further include: sending a message for inquiring whether the UE supports the second MSD, to the UE. In this case, the receiving of the first information from the UE at operation S510 may include receiving a response to the message from the UE, wherein the first information is included in the response. The disclosure does not limit the type or form of the message used to inquiring whether the UE supports the second MSD and the type or form of the response to the message.

Alternatively, according to an embodiment, although not shown in FIG. 5, the wireless communication method performed by the network entity shown in FIG. 5 may further include: sending a message for inquiring whether the UE supports the band combination to the UE. In this case, the receiving of the first information from the UE at operation S510 may include: receiving a response to the message from the UE, wherein, the response includes the first information and second information related to the band combination. Similarly, the disclosure does not limit the type or form of the message for inquiring whether the UE supports the second MSD and the type or form of the response to the message. For example, the second information may be an information set for a certain BC, and the information set may include, for example, information indicating that the BC is supported, information of a bandwidth combination set, and/or basic information about the BC.

After receiving the first information from the UE (wherein the first information is information related to whether the UE supports second maximum sensitivity degradation (MSD) lower than first MSD for a band combination or a band in the band combination), at operation S520, according to the first information, the band combination is configured for the UE or the band combination is not configured for the UE. For example, it may be determined according to the first information whether the UE supports the second MSD for the band combination or the band within the band combination, and the band combination is configured for the UE or the band combination is not configured for the UE, according to a result of the determination.

If the first information includes information indicating whether the UE supports the second MSD for the band combination or the band within the band combination, the network entity may directly determine whether the UE supports the second MSD for the band combination or the band within the band combination according to the information. For example, if it is determined according to the information that the UE supports the second MSD for the band combination or the band within the band combination, the band combination is configured for the UE. If the first information includes the information related to the actual MSD of the UE for the band combination, the determining of whether the UE supports the second MSD for the band combination or the band within the band combination according to the first information may include: determining whether the UE supports the second MSD for the band combination or the band within the band combination, according to second MSD threshold information and the information related to the actual MSD. For example, if it is determined according to the second MSD threshold information and the information related to the actual MSD that the UE supports the second MSD for the band combination or the band within the band combination, the band combination is configured for the UE. That is to say, in this case, the network entity itself determines whether the UE supports the second MSD for the band combination or the band according to the received actual MSD information, rather than the UE directly notifying the network entity whether the UE supports the second MSD for the band combination or the band within the band combination. Herein, if the UE supports the second MSD for a certain band combination or a certain band in the certain band combination, it means that the UE has the Low MSD capability for this band combination or this band, and on the contrary, if the UE does not support the second MSD for a certain band combination or a certain band in the certain band combination, it means that the UE does not have the Low MSD capability for this band combination or this band within the band combination.

As mentioned in the description about FIG. 4, the second MSD threshold information may be directly defined in the specification, or may be sent by the UE to the network entity, so that the network entity may determine whether the UE supports the second MSD for the band combination according to the second MSD threshold information and the received information related to the actual MSD. Alternatively, the second MSD threshold information may also be determined by the network. Thus, as an example, the second MSD threshold information may include the second MSD threshold information received from the UE; or the second MSD threshold information that is pre-defined; or the second MSD threshold information determined by the network. For example, the second MSD threshold information received from the UE may be the second MSD threshold information actively reported by the UE, or also may be the second MSD threshold information obtained by the network entity firstly sending a message to the UE for inquiring about the second MSD threshold information and receiving a response to the message from the UE, wherein the response includes the second MSD threshold information.

According to an embodiment, the second MSD threshold information may be defined according to each interference source in each band in the band combination; or defined according to each band in the band combination.

Besides, according to an embodiment, the second MSD threshold information includes absolute second MSD threshold information and/or relative second MSD threshold information, wherein, the relative second MSD threshold information is obtained based on the absolute second MSD threshold information and/or the first MSD.

In the above description about FIG. 4, the details involved in the above-mentioned second MSD threshold information have been described, and therefore, the details are not repeated here.

In addition, the way of the network entity determining whether the UE supports the second MSD for the band combination or the band according to the second MSD threshold information and the information related to the actual MSD is same as the above-mentioned way of the UE determining whether the UE supports the second MSD for the band combination or the band according to the information related to the actual MSD of the UE for the band combination and the second MSD threshold information related to the band combination. Thus, it will not be repeated here, and the relevant content may refer to the corresponding content in the description of FIG. 4.

Additionally, as mentioned above, the network entity may send a message to the UE inquiring whether the UE supports the band combination, and receive a response to the message from the UE, wherein the response may include the first information and the second information related to the band combination. In this case, alternatively, the configuring of the band combination for the UE or not configuring of the band combination for the UE according to the first information may include: configuring the band combination for the UE or not configuring the band combination for the UE, according to the first information and the second information. For example, it may be determined according to the second information whether the UE supports the band combination, and in the case that the UE supports the band combination, the band combination is configured for the UE or not configured for the UE according to the first information.

Besides, alternatively, the configuring of the band combination for the UE or not configuring of the band combination for the UE according to the first information may include: in case that the first MSD is unacceptable by the network entity, configuring the band combination for the UE or not configuring the band combination for the UE, according to the first information. For example, although not shown, the wireless communication method shown in FIG. 5 may further include: determining whether the first MSD is acceptable by the network entity. The network entity may determine whether the first MSD (i.e., the MSD in the existing specification) is acceptable by the network entity through a table look-up or other means. For example, if the network entity finds that the first MSD recorded in the table does not meet its expectation through the table look-up, the network entity considers that the first MSD is unacceptable by the network entity. In this case, the band combination may be configured for the UE or not configured for the UE further according to the first information. For example, it is determined according to the first information whether the UE supports second MSD lower than the first MSD for the band combination or the band within the band combination, and if the UE supports the second MSD lower than the first MSD, the band combination is configured for the UE. In addition, the wireless communication method shown in FIG. 5 may further include: when it is determined that the first MSD is acceptable by the network entity, determining whether to configure the band combination for the UE according to channel quality of a secondary cell serving the UE. Here, the secondary cell may correspond to the second band in the band combination. It should be noted that, the configuring of the band combination for the UE or not configuring of the band combination for the UE according to the first information does not necessarily have to be performed in the case that the first MSD is unacceptable by the network entity. For example, as mentioned above, in the case that the UE supports the band combination, the band combination may be configured for the UE or not configured for the UE according to the first information. For example, if when the network entity inquiries whether the UE supports the band combination, the first information (e.g., information indicating whether the UE supports the second MSD) has been reported together with the second information related to the band combination to the network entity, the operation of determining whether the first MSD is acceptable by the network entity may not be performed, but if it is determined that the UE supports the band combination, the band combination may be configured for the UE or the band combination may not be configured for the UE directly according to the first information.

According to an embodiment, the configuring of the band combination for the UE or not configuring of the band combination for the UE according to the first information may include: if it is determined that the UE supports the second MSD, determining whether to configure the band combination for the UE, according to channel quality of a secondary cell serving the UE. If it is determined that the UE does not support the second MSD, the band combination may not be configured for the UE. For example, if it is determined that the MSD in the specification is unacceptable by the network entity before or after it is determined that the UE does not support the second MSD, the band combination may not be configured for the UE. If it is determined that the MSD in the specification is acceptable by the network entity before or after it is determined that the UE does not support the second MSD, the band combination may be configured for the UE. In fact, the disclosure does not limit the relevant operations performed by the network in the case that it is determined that the UE does not support the second MSD.

According to an embodiment, the mentioned above configuring of the band combination for the UE or not configuring of the band combination for the UE according to the first information may include: determining channel quality of a secondary cell, according to a result of an inter-band measurement and the first information; if the channel quality of the secondary cell is acceptable, configuring the band combination for the UE; and if the channel quality of the secondary cell is unacceptable, not configuring the band combination for the UE. Here, since the channel quality of the secondary cell is determined according to the result of the inter-band measurement and the first information, that is, the channel quality of the secondary cell is not determined only based on the result of the inter-band measurement, therefore, the channel quality of the secondary cell may be determined more accurately, so that it can prevent the secondary cell from being deactivated even if the secondary cell accesses to the network, since the channel quality does not meet a requirement due to suffering from too much interference after the connection.

In addition, alternatively, the wireless communication method shown in FIG. 5 may further include: activating the band combination for the UE or not activating the band combination for the UE, according to the first information. For example, if it is determined according to the first information that the UE supports the second MSD for the band combination or the band within the band combination, the band combination may be activated, otherwise, the band combination may not be activated.

In addition, alternatively, the wireless communication method shown in FIG. 5 may further include: deactivating the secondary cell, according to channel quality measurement information about the band combination and/or the first information. For example, if it is determined according to the channel quality measurement information about the band combination and/or the first information that the channel quality of the secondary cell deteriorates or does not meet a requirement, the secondary cell may be deactivated.

The wireless communication method performed by the network entity according to an embodiment of the disclosure has been described above with reference to FIG. 5. According to the wireless communication method, since the first information is received from the UE (the first information is information related to whether the UE supports second maximum sensitivity degradation (MSD) lower than first MSD for a band combination), the band combination is configured for the UE or not configured according to the first information, the band combination can be configured more flexibly and accurately.

For ease of understanding, an example of configuring a BC for a UE using the above wireless communication method performed by the network entity is briefly described below with reference to FIG. 6.

FIG. 6 is a schematic diagram of the wireless communication method configuring a BC for a UE according to an embodiment of the disclosure.

Referring to FIG. 6, when the UE is in a connection mode (i.e., a primary cell is connected, and the primary cell may correspond to a band of the BC) according to operation S601, the network checks whether the UE capability supports the BC according to operation S602, and if not, the network does not configure the BC according to operation S608. If the UE supports this BC, the network determines whether the MSD in the specification (i.e., the first MSD above) is acceptable through looking up a table look-up or other means according to operation S603, and if not, it is determined whether the UE supports the second MSD for this BC (i.e., whether it supports the Low MSD capability or has the Low MSD capability) according to operation S607. Specifically, it is determined whether the second MSD is supported according to first information received from the UE according to operation S607. If the second MSD is not supported, the BC is not configured according to operation S608. In case that the MSD in the specification is acceptable or the MSD in the specification is not acceptable but the UE supports the second MSD for this BC, an inter-band measurement may be performed in operation S604 to determine the channel quality of the secondary cell according to operation S605, and if the channel quality does not meet a requirement, the BC is not configured according to operation S608, otherwise, if the channel quality of the secondary cell is acceptable, the BC is configured according to operation S606. For example, as shown in FIG. 6, an inter-band measurement may be performed for the BC, and then, the channel quality of the secondary cell is determined according to the result of the inter-band measurement and the first information. If the channel quality of the secondary cell is acceptable, the BC is configured for the UE, and if the channel quality of the secondary cell is not acceptable, the BC is not configured for the UE.

The wireless communication methods performed by the UE and the network entity respectively according to the embodiment of the disclosure have been described above, and below, the UE and the network entity are briefly described.

Figure 7:
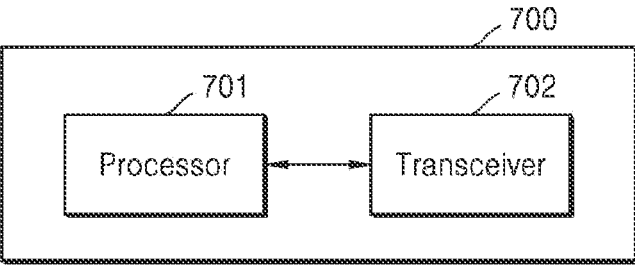
FIG. 7 is a block diagram of the user equipment according to an embodiment of the disclosure.

FIG. 7 is a block diagram of a user equipment according to an embodiment of the disclosure.

Referring to FIG. 7, the user equipment 700 may include at least one processor 701 and a transceiver 702. Specifically, the at least one processor 701 may be coupled with the transceiver 702 and configured to perform the wireless communication method mentioned in the above description with respect to FIG. 4. For details of the operations involved in the above-mentioned wireless communication method, reference may be made to the description of FIG. 4, which will not be repeated here.

Figure 8:
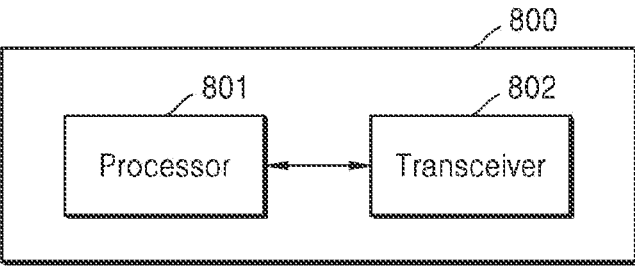
FIG. 8 is a block diagram of the network entity according to an embodiment of the disclosure.

FIG. 8 is a block diagram of a network entity according to an embodiment of the disclosure.

Referring to FIG. 8, the network entity 800 may include a transceiver 801 and at least one processor 802. Specifically, the at least one processor 802 may be coupled to the transceiver 801 and configured to perform the wireless communication method mentioned in the description above with respect to FIG. 5. For details of the operations involved in the above-mentioned wireless communication method, reference may be made to the descriptions in FIG. 5 and FIG. 6, and details are not repeated here.

According to an embodiment of the disclosure, there may also be provided a non-transitory computer-readable storage medium storing instructions, wherein the instructions, when executed by at least one processor, cause the at least one processor to execute the above described various wireless communication methods according to the embodiments of the disclosure. Examples of the computer-readable storage medium here include: Read Only Memory (ROM), Random Access Programmable Read Only Memory (PROM), Electrically Erasable Programmable Read Only Memory (EEPROM), Random Access Memory (RAM), Dynamic Random Access Memory (DRAM), Static Random Access Memory (SRAM), flash memory, non-volatile memory, compact disc read only memory (CD-ROM), CD-R, CD+R, CD-RW, CD+RW, digital versatile disc (DVD)-ROM, DVD-R, DVD+R, DVD-RW, DVD+RW, DVD-RAM, BD-ROM, BD-R, BD-R LTH, BD-RE, Blu-ray or optical disc storage, Hard Disk Drive (HDD), Solid State Drive (SSD), card storage (such as multimedia card, secure digital (SD) card or extremely fast digital (XD) card), magnetic tape, floppy disk, magneto-optical data storage device, optical data storage device, hard disk, solid state disk and any other devices which are configured to store computer programs and any associated data, data files, and data structures in a non-transitory manner, and provide the computer programs and any associated data, data files, and data structures to the processor or the computer, so that the processor or the computer may execute the computer programs. The instructions and the computer programs in the above computer-readable storage mediums may run in an environment deployed in computer equipment such as a client, a host, an agent device, a server, etc. In addition, in one example, the computer programs and any associated data, data files and data structures are distributed on networked computer systems, so that computer programs and any associated data, data files, and data structures are stored, accessed, and executed in a distributed manner through one or more processors or computers.

According to an embodiment of the disclosure, if the first information comprises the information related to the actual MSD of the UE for the band combination. According to an embodiment of the disclosure, the determining of whether the UE supports the second MSD for the band combination or the band within the band combination, according to the first information, comprises determining whether the UE supports the second MSD for the band combination or the band within the band combination, according to second MSD threshold information and the information related to the actual MSD.

According to an embodiment of the disclosure, the second MSD threshold information comprises at least one of the second MSD threshold information received from the UE, the second MSD threshold information that is pre-defined, or the second MSD threshold information determined by the network.

According to an embodiment of the disclosure, the second MSD threshold information is defined according to each interference source in each band in the band combination; or defined according to each band in the band combination.

According to an embodiment of the disclosure, the second MSD threshold information comprises absolute second MSD threshold information and/or relative second MSD threshold information.

According to an embodiment of the disclosure, the relative second MSD threshold information is obtained based on the absolute second MSD threshold information and/or the first MSD.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a network entity in a wireless communication system, the method comprising:

receiving first information from a user equipment (UE), wherein the first information comprises information related to actual maximum sensitivity degradation (MSD) of the UE for a band combination, wherein the information related to the actual MSD of the UE comprises information related to relative actual MSD which indicates a relative value of the actual MSD with respect to a first MSD;

identifying, based on the received information related to actual MSD of the UE for the band combination, whether the UE supports a second MSD, which is lower than the first MSD, for the band combination or a band in the band combination; and in case that the UE supports the second MSD, configuring the band combination for the UE, wherein the identifying of whether the UE supports the second MSD for the band combination or the band in the band combination comprises:

identifying whether a relative value of the actual MSD with respect to the first MSD within an MSD threshold range for the band combination or the band in the band combination, in case that the relative value of the actual MSD with respect to the first MSD within the MSD threshold range, identifying that the UE supports the second MSD for the band combination or the band in the band combination, and in case that the relative value of the actual MSD with respect to the first MSD is not within the MSD threshold range, identifying that the UE does not support the second MSD for the band combination or the band in the band combination.

2. The method according to claim 1, wherein information related to actual MSD of the UE for the band combination further comprises information related to absolute actual MSD which indicates actual MSD value of the UE caused by at least one interference source in a band within the band combination.

3. The method according to claim 2, wherein the information related to the relative actual MSD is obtained based on the absolute actual MSD and the first MSD.

4. The method according to claim 1, wherein the configuring of the band combination for the UE or not configuring of the band combination for the UE based on the first information comprises:

in a case that the first MSD is unacceptable by the network entity, configuring the band combination for the UE or not configuring the band combination for the UE based on the first information.

5. The method according to claim 1, wherein the configuring of the band combination for the UE or not configuring of the band combination for the UE based on the first information comprises:

identifying channel quality of a secondary cell based on a result of an inter-band measurement and the first information;

in case that the channel quality of the secondary cell is acceptable, configuring the band combination for the UE; and in case that the channel quality of the secondary cell is unacceptable, not configuring the band combination for the UE.

6. The method according to claim 1, further comprising:

in case that the UE supports the second MSD, activating the band combination for the UE, and in case that the UE does not support the second MSD, not activating the band combination for the UE based on the first information.

7. The method according to claim 6, further comprising:

deactivating a secondary cell based on channel quality measurement information about at least one of the band combination or the first information.

8. The method according to claim 1, further comprising:

transmitting a message to the UE for inquiring whether the UE supports the second MSD, wherein the receiving of the first information from the UE comprises: receiving, from the UE, a response including the first information in response to the message.

9. The method according to claim 8, wherein the response further comprises second information related to the band combination, and wherein the configuring of the band combination for the UE or not configuring of the band combination for the UE based on the first information comprises configuring the band combination for the UE or not configuring the band combination for the UE based on the first information and the second information.

10. A method performed by a user equipment (UE) in a wireless communication system, the method comprising:

transmitting first information to a network entity, wherein the first information comprises information related to actual maximum sensitivity degradation (MSD) of the UE for a band combination, wherein the information related to the actual MSD of the UE comprises information related to relative actual MSD which indicates a relative value of the actual MSD with respect to a first MSD; and in case that the UE supports a second MSD lower than the first MSD is identified based on the information related to actual MSD of the UE, receiving, from the network entity, information for configuring the band combination, wherein whether the UE supports the second MSD for the band combination or the band in the band combination is identified based on whether a relative value of the actual MSD with respect to the first MSD within an MSD threshold range for the band combination or the band in the band combination.

11. A network entity in a wireless communication system, comprising:

a transceiver; and at least one processor, coupled to the transceiver and configured to:

receive first information from a user equipment (UE), wherein the first information comprises information related to actual maximum sensitivity degradation (MSD) of the UE for a band combination, wherein the information related to the actual MSD of the UE comprises information related to relative actual MSD which indicates a relative value of the actual MSD with respect to a first MSD, identify, based on the received information related to actual MSD of the UE for the band combination, whether the UE supports a second MSD lower than the first MSD for the band combination or a band in the band combination, and in case that the UE supports the second MSD, configure the band combination for the UE or not configuring the band combination for the UE, wherein the identifying of whether the UE supports the second MSD for the band combination or the band in the band combination comprises:

identifying whether a relative value of the actual MSD with respect to the first MSD with respect to the first MSD is within an MSD threshold range for the band combination or the band in the band combination, in case that the relative value of the actual MSD with respect to the first MSD is within the MSD threshold range, identifying that the UE supports the second MSD for the band combination or the band in the band combination, and in case that the relative value of the actual MSD with respect to the first MSD is not within than the MSD threshold range, identifying that the UE does not support the second MSD for the band combination or the band in the band combination.

12. A user equipment (UE) in a wireless communication system, comprising:

a transceiver; and at least one processor, coupled to the transceiver and configured to:

transmit first information to a network entity, wherein the first information comprises information related to actual maximum sensitivity degradation (MSD) of the UE for a band combination, wherein the information related to the actual MSD of the UE comprises information related to relative actual MSD which indicates a relative value of the actual MSD with respect to a first MSD, in case that the UE supports a second MSD lower than the first MSD defined in standard specification is identified based on the information related to actual MSD of the UE, receive, from the network entity, information for configuring the band combination, wherein whether the UE supports the second MSD for the band combination or the band in the band combination is identified based on whether a relative value of the actual MSD with respect to the first MSD within an MSD threshold range for the band combination or the band in the band combination.

* * * * *